Patented Oct. 7, 1952

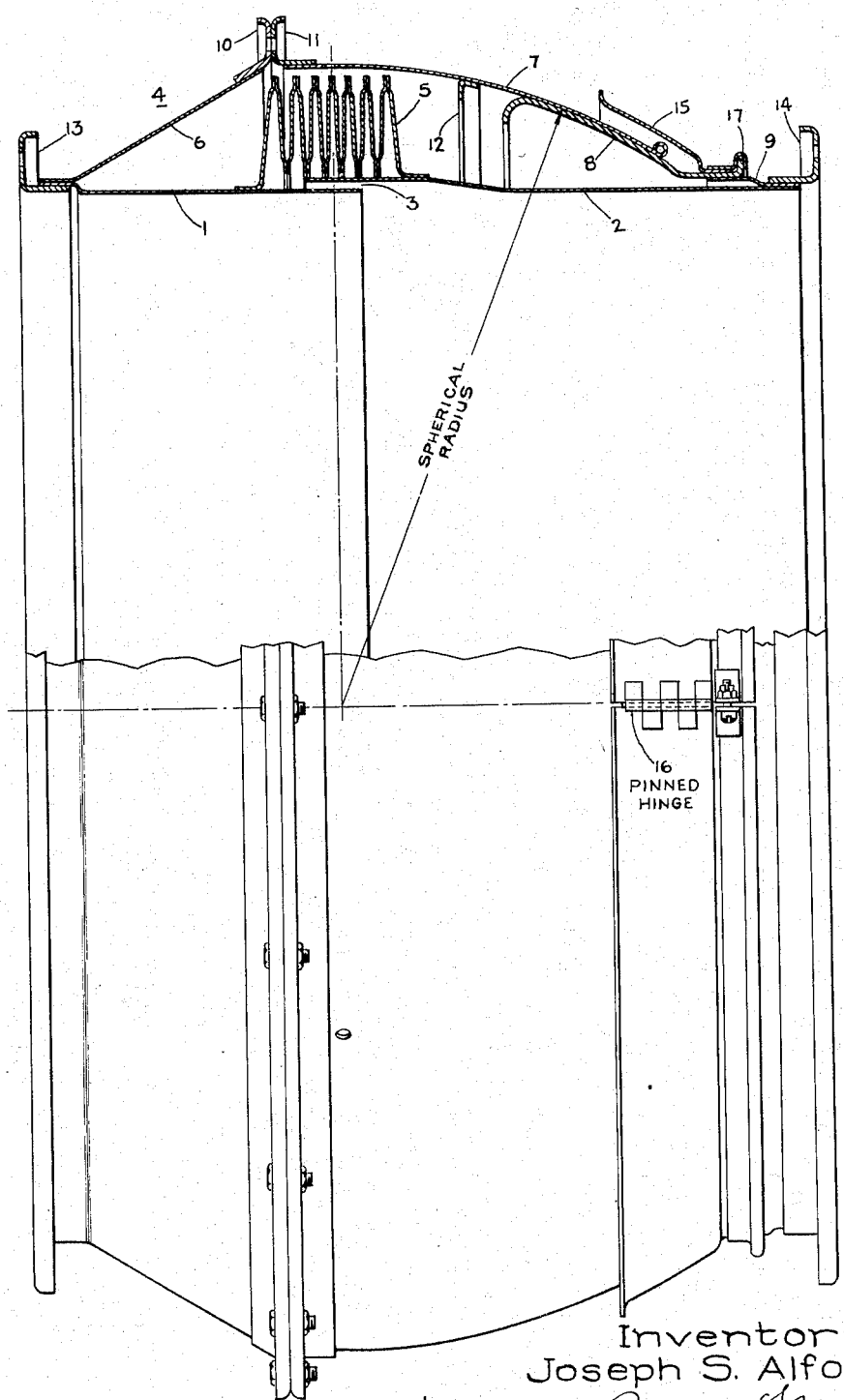

2,613,087

UNITED STATES PATENT OFFICE 2,613,087

FLEXIBLE CONDUIT JOINT

Joseph S. Alford, Nahant, Mass., assignor to General Electric Company, a corporation of New York Application December 24, 1948, Serial No. 67,104

3 Claims. (Cl. 285—92)

1

This invention relates to flexible conduit joints for connecting two conduit sections subject to relative angular displacements. Such conduits are used, for example, in aircraft for conducting gases from a gas turbine type power plant to a suitable propelling nozzle in jet propelled aircraft, or from the exhaust ports of an internal combustion engine to a turbo-supercharger.

In the installation of a gas turbine power plant in an aircraft, a conduit must be provided for conducting hot gases discharged by the turbine to the atmosphere in such a manner as to prevent damage to adjacent parts of the aircraft by the hot gases. Often the exhaust conduit is relatively long and may be too heavy to be supported solely by the turbine structure. In such cases it is desirable to divide the exhaust conduit into at least two portions. A first conduit portion is connected to and supported by the turbine structure. This conduit portion is made as short as possible to minimize the load imposed upon the turbine structure by the weight of the conduit portion and by deflections thereof which are the result of flight maneuvers. A second conduit portion is supported by the aircraft structure and a flexible conduit connection is provided between the two conduit portions to prevent large bending loads from being transmitted to the turbine structure. The use of flexible bellows in flexible conduit connections for similar types of services is well known, but the use of a flexible bellows alone presents an unsatisfactory solution of the problem in aircraft service of the type described. The problem is further complicated by the existence of gas pressure forces tending to separate adjacent conduit portions, and which may amount to as much as four to five tons or more. In addition, the temperature of the gases conveyed by such a conduit may exceed 1000° F. Ordinary flexible bellows often do not have sufficient strength to withstand loads of this magnitude at elevated temperatures with any degree of safety. Furthermore, if an ordinary bellows were constructed with sufficient strength to withstand loads of the above-mentioned magnitudes and temperatures, it would be so stiff as to have no flexibility whatever for all practical purposes.

Accordingly, it is an object of this invention to provide an improved flexible joint capable of withstanding high axial loads, which provides sufficient flexibility to avoid transmittal of excessive bending loads to the conduit supporting structure.

It is also an object of the invention to provide a flexible arrangement which distributes axial

2 forces in such a manner that they exert approximately equal intensity of stress at the conduit connecting flange and which minimizes the effect of shearing forces acting at the joint.

A further object is to provide a flexible joint of the type described which prevents leakage of fluid therefrom, is simple in design, relatively cheap to manufacture, and effective in operation.

Other objects and advantages will be apparent from the following descriptions taken in connection with the single accompanying drawing. In the drawing, coaxial conduits or conduit sections 1, 2 are provided to convey fluid from one conduit system to another (neither of which are shown), for example, from a turbine to an exhaust conduit. An end portion of one of the conduit sections may be inserted into the adjacent end portion of the other conduit section in telescoping relation as indicated in the drawing to provide the smoothest possible wall surface for the flowing gases. A generous clearance space 3 is provided to permit relative thermal expansion of the telescoping end portions and the desired degree of angularity therebetween without physical interference. Of course, it will be appreciated that instead of providing telescoping end portions it may be more convenient to provide sufficient axial spacing between the adjacent end portions of conduit sections 1, 2 to permit sufficient angularity and relative thermal expansion.

The respective conduit sections 1, 2 are connected by a flexible joint arrangement 4 to form a single continuous fluid passage. The telescoping end portions of conduit sections 1, 2 are enclosed by a flexible bellows, hermetically sealing conduit section 1 to conduit section 2. The seal includes a flexible bellows 5 concentrically spaced from conduit sections 1, 2 and having end portions welded to the respective conduit sections. The use of a flexible bellows has the advantage of providing a positive seal against the leakage of fluid from the interior of the conduit and at the same time it provides flexibility without exerting undue resistance to limited, relative axial and angular movements between the end portions of conduit sections 1 and 2. An exterior casing or shell is arranged to serve the dual purpose of providing a barrier to the leakage of fluid in the event of a failure of bellows 5, and at the same time to absorb high axial loads produced by fluid pressure forces, thus protecting the bellows. The casing is arranged to permit limited angular movement of conduit sections 1 and 2 without harmful effect on the bellows. As illustrated in the drawing, the casing comprises a conical wall portion 6, spherical wall portions 7, 8 and Z-section 9. Conical wall portion 6 has an end portion welded to conduit section 1. A flange 10 for connection with a similar flange 11 which is provided at the left-hand end portion of spherical wall 7 is provided at the right-hand end portion of conical wall 6. The other spherical wall portion 8 is provided with a cylindrical end portion adapted to be welded to one end of Z-section 9. The other end of Z-section 9 is welded to conduit section 2. The outer spherical surface of wall 8 is arranged for limited sliding contact with the inner spherical surface of wall 7, thus forming a spherical bearing surface. In some cases it may be desirable, although not essential to the invention, to secure a stiffening member 12 to outer wall 7 for providing additional stiffness thereto to insure that proper contact between the spherical wall surfaces 7 and 8 is maintained. In the embodiment of the invention illustrated in the drawing, wall portions 6 and 9 have been included to provide ease of assembly and disassembly, but it will be appreciated that these wall portions may be omitted, if desired, and walls 7, 8 may be attached directly to conduit sections 1, 2.

According to the invention, the center of curvature of the spherical wall portions 7, 8 coincides with the center lines of conduit sections 1, 2, and with a plane normal to these center lines and at a location midway between the end portions of the bellows 5. It is well known that flexible bellows cannot safely withstand the effects of shearing forces acting at right angles to the axis of the bellows. However, by making the center of curvature of the spherical surfaces 7, 8 coincide with the axis of the bellows at a location midway between the bellows end portions, the adverse effect of shearing forces which are normally set up when conduit sections 1, 2 are angularly disposed to one another is minimized.

In order to provide sufficient angular flexibility and at the same time insure that walls 7 and 8 will slide relative to each other and thus avoid the transmittal of large bending loads to the conduit supporting structure, the slope at all points within the area of contact of the contacting spherical surfaces 7, 8 must be greater than the coefficient of friction of the wall materials used. This means that the radius of curvature of the contacting spherical surfaces 7, 8 must be greater than a certain minimum value so that the above-mentioned condition can be met and to permit making the area of contact sufficiently large so that the unit force acting between the friction surfaces 7 and 8 will be sufficiently small to permit slipping to occur. It can be shown that the moment required to produce angular movement of one of the conduit sections 1, 2 relative to the other is very closely approximated by the following expression:

$$M = 4\mu S r^3 (\theta_2 - \theta_1) k \int_0^{\pi/2} \sqrt{1 - k^2 \sin^2 \alpha}\, d\alpha$$

In this expression, M is the moment in inch-pounds required to produce angular displacement of said conduit sections, $\mu$ is the coefficient of friction of the bearing surfaces, S is the radial compressive stress in pounds per square inch at the bearing surfaces, $r$ is the radius in inches of the spherical bearing surface, $\theta_1$ and $\theta_2$ are angles between a plane normal to the axis of the conduit sections passing through the center of curvature of the spherical bearing surface, and the beginning and end of the bearing surface respectively, K is cosine of the average value of the angle of contact, that is, the arithmetic average of $\theta_1$ and $\theta_2$, and $\alpha$ is the angle between a reference plane coincident with the axis of the conduit sections and another plane coincident with the axis of the conduit portions and the line of contact on the spherical surface made by another plane parallel to the reference plane. It can be further shown that a particular value of the spherical radius $r$ results in a minimum value of the bending moment. By making the radius of curvature of the spherical surfaces 7, 8 equal to this value of $r$ which results in the minimum value of bending moment, it will be appreciated that a minimum amount of bending load will be transmitted to the turbine structure.

Flanges 13, 14 are provided at the ends of conduit sections 1, 2 to facilitate connecting the flexible joint in a conduit system. In the event that the flexible joint may be subjected to reversals in the direction of the axial load, spherical wall portion 15 surrounds a portion of spherical wall 7 and is arranged to withstand load in the opposite direction to that taken by walls 7, 8. For ease of assembly, it may be desirable to divide wall 15 into two portions connected by a pin joint 16, as indicated in the drawing. A circumferential clamping member 17, which may be of the type more particularly described in Patent 2,424,436 issued on an application of Wilbur D. Crater and assigned to the same assignee as the present application, is provided to maintain wall 15 in spaced relation with spherical wall 7.

In operation, unbalances in fluid pressure forces in an axial direction will produce a load upon the joint 4 tending to separate conduit sections 1 and 2. This load is entirely taken by the spherical bearing surfaces of walls 7 and 8, thus preventing excessive loads from acting upon the flexible bellows 5. It is an important feature of this construction that since walls 7 and 8 are spherical and therefore completely surround the axis of the respective conduit sections, any axial loads resulting from unbalanced fluid pressure forces are therefore transmitted uniformly to the periphery of the respective conduit sections 1 and 2. It is also an important feature that the center of curvature of the spherical walls 7, 8 coincides with the centerline of the bellows and with the axis of the conduit sections 1, 2 to substantially eliminate shearing forces on the bellows. In the event that there is a reversal in the direction of the axial load, walls 7, 15 form bearing surfaces for transmitting this load uniformly to the periphery of the respective conduit sections 1 and 2, still preventing excessive axial loads from being imposed upon bellows 5.

Thus it will be seen that the invention provides an improved flexible joint, in which the effect of radial loads on the bellows is minimized, axial loads are distributed uniformly around the periphery of the respective conduit sections and are prevented from acting upon the flexible bellows, and which is hermetically sealed and is relatively cheap to manufacture.

While particular embodiments of the invention have been illustrated and described, it will be apparent to those familiar with the art that various changes and modifications may be made without departing from the invention, and it is intended to cover in the appended claims all such changes and modifications that come within the true spirit and scope of the invention.

What I claim as new and desire to secure by Letters Patent of the United States is:

1. In a sealed flexible joint adapted to effect angular displacements between portions of a conduit for carrying fluid at a pressure different from ambient pressure, the combination of first and second conduit sections with portions thereof adapted to be in overlapping relationship forming a slip joint, flexible sealing means enclosing said joint and having end portions sealed to the first and second conduit sections respectively beyond the portions thereof adapted to be in overlapping relationship, and first and second wall portions enclosing and spaced from said sealing means and having end portions secured to the first and second conduit sections respectively, said first and second wall portions having substantially continuous contacting surfaces of revolution with a slope at any point thereon with respect to the axis of said conduit sections greater than the coefficient of friction of said wall materials between said contacting surface.

2. A flexible joint for withstanding high axial loads including first and second conduit sections with portions thereof forming a telescope joint adapted to effect relative angular displacements of said conduit sections, a flexible member surrounding said joint and having end portions sealed to the respective conduit sections beyond the limits of the overlap of said portions, and first and second walls having end portions secured to the respective conduit sections and surrounding and spaced from the flexible member, said walls having portions defining spherical contacting bearing surfaces which are substantially continuous and axially spaced from both end portions of said flexible member in any operating position of said conduit sections and having a slope greater than the coefficient of friction between said bearing surfaces at all points thereon.

3. Apparatus in accordance with claim 2 wherein the value of the radius of curvature of said surfaces is that value which makes the expression $$M = 4\mu S r^3 (\theta_2 - \theta_1) k \int_0^{\pi/2} \sqrt{1 - k^2 \sin^2 \alpha} \, d\alpha$$

a minimum, where M is the moment in inch-pounds required to produce angular displacement of said conduit sections, $\mu$ is the coefficient of friction of the bearing surfaces, S is the radial compressive stress in pounds per square inch at the bearing surfaces, $r$ is the radius in inches of the spherical bearing surface, $\theta_1$ and $\theta_2$ are angles between a plane normal to the axis of the conduit sections passing through the center of curvature of said surface and the beginning and end of the bearing surface respectively, $k$ is the cosine of the average value of the angle of contact, which is the arithmetic average of $\theta_1$ and $\theta_2$, and $\alpha$ is the angle between a reference plane containing the axis of said conduit section and another plane containing the axis of said conduit portions and the line of contact on the spherical surface made by another plane parallel to said reference plane.

JOSEPH S. ALFORD.

REFERENCES CITED

The following references are of record in the file of this patent:

UNITED STATES PATENTS

| Number | Name | Date |
| --- | --- | --- |
| 390,240 | Legat | Oct. 2, 1888 |
| 486,986 | Schinke | Nov. 29, 1892 |
| 1,561,033 | Spencer | Nov. 10, 1925 |
| 1,821,274 | Plummer | Sept. 1, 1931 |
| 2,242,604 | Wells | May 20, 1941 |
| 2,337,038 | Fentress | Dec. 21, 1943 |
| 2,417,250 | Harvey | Mar. 11, 1947 |